UNITED STATES PATENT OFFICE.

WILLIAM STACK, OF SUSSEX, CANADA.

IMPROVEMENT IN PROCESSES FOR BAITING AND CLEANSING HIDES.

Specification forming part of Letters Patent No. 152,187, dated June 16, 1874; application filed May 23, 1874.

*To all whom it may concern:*

Be it known that I, WILLIAM STACK, of Sussex, in the county of Kings, New Brunswick, Canada, have invented a new and Improved Process for Baiting and Cleansing Hides, of which the following is a specification:

In a vat six feet by four feet, and six feet deep, containing about three feet of water, I put three bushels of bran, three pints oil vitriol, and one peck of salt, and the same proportions for vats of different sizes. In this vat I put a batch or pack of sixty sides or two hundred skins. This baits the hides in from eight to forty-eight hours, according to age—say, twenty-four hours for calf, goat, and sheep, and forty-eight hours for harness and upper leather, and from two to five hours for sole-leather. When the bait is old, eight or nine hours will do for skins, and twenty-four hours for sides, upper, and harness leather; but the time will be regulated mainly by the judgment of the tanner.

For a second pack, one bushel of bran, one pint of vitriol, and two quarts of salt will do; and for a third pack, half a bushel of bran, one pint of vitriol, and two quarts of salt will be required.

To prepare the bait, put three bushels of bran in a barrel, cover it about three inches with water, and let it stand seven or eight days before putting it in the vat.

For a new bait, always keep a little bran and water in a barrel ready for use; and after the third pailful or two of bran and water for every pack, add one pint of vitriol and one pint or quart of salt, according as the bait is strong or weak. In a new bait, "handle up" the hides three times the first day and twice the second.

In another vat, commonly the one called the pool, with sufficient water to cover the hides, put in a half-barrel of tar-water and soda, in the proportion of two-thirds of a barrel of water, one pailful of coal-tar, and one pound of bicarbonate of soda, and wash and cleanse the hides in it after they have remained a sufficient length of time in the bait, which completes the process, and makes the hides ready for the tan-liquors.

When the bait gets old, I put into it half a barrel of tar-water. It acts as a check on it, and keeps the smell down.

To make a very fine quality of calf or kip, I work them lightly on a beam out of this mixture in the pool.

This process makes the leather from five to ten per cent. heavier than the common process.

Having thus described my invention, what I claim as new, and desire to secure by Letters Patent, is—

The process for baiting and cleansing hides and skins by the means and in the manner herein described.

WILLIAM STACK.

Witnesses:
 GEO. A. NOBLE,
 D. B. WARNER.